United States Patent
Balachandran et al.

(10) Patent No.: US 9,214,970 B2
(45) Date of Patent: Dec. 15, 2015

(54) METHOD OF RECEIVING A SIGNAL IN A WIRELESS COMMUNICATION NETWORK AND ASSOCIATED NETWORK ELEMENTS

(71) Applicant: Alcatel-Lucent USA Inc., Murray Hill, NJ (US)

(72) Inventors: Krishna Balachandran, Morganville, NJ (US); Joseph H. Kang, Belle Mead, NJ (US); Kemal M. Karakayali, Hoboken, NJ (US); Kiran M. Rege, Marlboro, NJ (US)

(73) Assignee: Alcatel Lucent, Boulogne-Billancourt (FR)

( * ) Notice: Subject to any disclaimer, the term of this patent is extended or adjusted under 35 U.S.C. 154(b) by 248 days.

(21) Appl. No.: 14/053,942

(22) Filed: Oct. 15, 2013

(65) Prior Publication Data

US 2015/0103737 A1    Apr. 16, 2015

(51) Int. Cl.
*H04B 7/02* (2006.01)
*H04B 1/10* (2006.01)

(52) U.S. Cl.
CPC . *H04B 1/10* (2013.01); *H04B 7/024* (2013.01)

(58) Field of Classification Search
CPC .................................. H04B 1/10; H04B 7/024
See application file for complete search history.

(56) References Cited

U.S. PATENT DOCUMENTS

| | | | |
|---|---|---|---|
| 6,507,603 B1* | 1/2003 | Haga et al. | 375/147 |
| 8,718,542 B2* | 5/2014 | Braithwaite | 455/11.1 |
| 2007/0190967 A1* | 8/2007 | Cho et al. | 455/403 |
| 2009/0268644 A1* | 10/2009 | Sezgin et al. | 370/280 |
| 2010/0034146 A1* | 2/2010 | Hou et al. | 370/328 |
| 2012/0030293 A1* | 2/2012 | Bobotek | 709/206 |

* cited by examiner

*Primary Examiner* — Jay P Patel
(74) *Attorney, Agent, or Firm* — Harness, Dickey & Pierce, P.L.C.

(57) ABSTRACT

In one embodiment, the method includes determining, at a network element, a first filter component based on reference sequences for user equipments in a first set. The method further includes determining a second filter component. The second component is based on a plurality of received signals and has estimated contributions to the plurality of received signals by the user equipments in the first set removed. The plurality of received signals are associated with a plurality of antennas. The method further includes filtering a selected received signal based on the first and second filter components to obtain an estimated signal for a selected user equipment.

20 Claims, 5 Drawing Sheets

METHOD OF RECEIVING A SIGNAL IN A WIRELESS COMMUNICATION NETWORK AND ASSOCIATED NETWORK ELEMENTS

BACKGROUND OF THE INVENTION

Macro base stations generally employ maximal ratio combining (MRC) receivers. An MMSE/IRC (Minimum Mean Squared Error/Interference Rejection Combining) receiver can reduce the perceived interference, improve the effective signal-to-interference-plus-noise-ratio (SINR), and improve user throughputs. While MMSE/IRC is typically employed across the antennas of a given sector, emerging Coordinated Multi-Point (CoMP) techniques would allow joint processing of antennas across multiple sectors and thus provide the potential for even further gain. In order to perform MMSE/IRC processing in CoMP, a covariance estimate is generated. MMSE/IRC performance is heavily dependent on the fidelity of this covariance estimate. Current methods for CoMP produce covariance estimates suffering from an inordinate amount of noise.

SUMMARY OF THE INVENTION

At least one embodiment relates to a method of receiving a signal in a wireless communication network.

In one embodiment, the method includes determining, at a network element, a first filter component based on reference sequences for user equipments in a first set. The method further includes determining a second filter component. The second component is based on a plurality of received signals and has estimated contributions to the plurality of received signals by the user equipments in the first set removed. The plurality of received signals are associated with a plurality of antennas. The method further includes filtering a selected received signal based on the first and second filter components to obtain an estimated signal for a selected user equipment.

At least one embodiment relates to a network element.

In one embodiment, the network element includes a memory and a processor. The memory is configured to store reference sequences for user equipments in a first set. The processor is configured to determine a first filter component based on the reference sequences for user equipments in the first set. The processor is configured to determine a second filter component. The second filter component is based on a plurality of received signals and has estimated contributions to the plurality of received signals by the user equipments in the first set removed. The plurality of received signals are associated with a plurality of antennas. The processor is configured to determine a filter based on the first and second filter components. The filter is for obtaining an estimated signal for a selected user equipment.

BRIEF DESCRIPTION OF THE DRAWINGS

The present invention will become more fully understood from the detailed description given herein below and the accompanying drawings, wherein like elements are represented by like reference numerals, which are given by way of illustration only and thus are not limiting of the present invention and wherein.

DETAILED DESCRIPTION OF THE EMBODIMENTS

Figure 1:
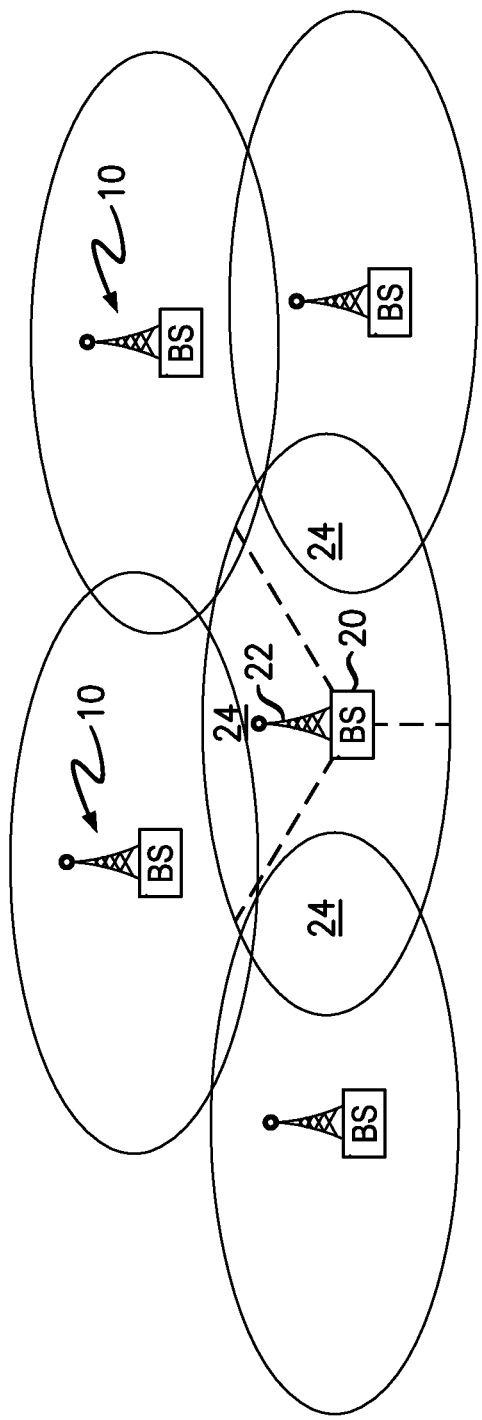
FIG. 1 illustrates a portion of a wireless communication network according to one embodiment.

Various example embodiments will now be described more fully with reference to the accompanying drawings in which some example embodiments are shown.

While example embodiments are capable of various modifications and alternative forms, the embodiments are shown by way of example in the drawings and will be described herein in detail. It should be understood, however, that there is no intent to limit example embodiments to the particular forms disclosed. On the contrary, example embodiments are to cover all modifications, equivalents, and alternatives falling within the scope of this disclosure. Like numbers refer to like elements throughout the description of the figures.

Although the terms first, second, etc. may be used herein to describe various elements, these elements should not be limited by these terms. These terms are only used to distinguish one element from another. For example, a first element could be termed a second element, and similarly, a second element could be termed a first element, without departing from the scope of this disclosure. As used herein, the term "and/or," includes any and all combinations of one or more of the associated listed items.

When an element is referred to as being "connected," or "coupled," to another element, it can be directly connected or coupled to the other element or intervening elements may be present. By contrast, when an element is referred to as being "directly connected," or "directly coupled," to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular embodiments only and is not intended to be limiting. As used herein, the singular forms "a," "an," and "the," are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Portions of example embodiments and corresponding detailed description are presented in terms of algorithms performed by a processor. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

Specific details are provided in the following description to provide a thorough understanding of example embodiments. However, it will be understood by one of ordinary skill in the art that example embodiments may be practiced without these specific details. For example, systems may be shown in block diagrams so as not to obscure the example embodiments in unnecessary detail. In other instances, well-known processes, structures and techniques may be shown without unnecessary detail in order to avoid obscuring example embodiments.

In the following description, illustrative embodiments will be described with reference to acts and symbolic representations of operations (e.g., in the form of flow charts, flow diagrams, data flow diagrams, structure diagrams, block diagrams, etc.) that may be implemented as program modules or functional processes include routines, programs, objects, components, data structures, etc., that perform particular tasks or implement particular abstract data types and may be implemented using existing hardware at existing network elements, existing end-user devices and/or post-processing tools (e.g., mobile devices, laptop computers, desktop computers, etc.). Such existing hardware may include one or more Central Processing Units (CPUs) or processors, digital signal processors (DSPs), application-specific-integrated-circuits, field programmable gate arrays (FPGAs) computers or the like.

Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Although a flow chart may describe the operations as a sequential process, many of the operations may be performed in parallel, concurrently or simultaneously. In addition, the order of the operations may be re-arranged. A process may be terminated when its operations are completed, but may also have additional steps not included in the figure. A process may correspond to a method, function, procedure, subroutine, subprogram, etc. When a process corresponds to a function, its termination may correspond to a return of the function to the calling function or the main function.

Note also that the software implemented aspects of example embodiments are typically encoded on some form of tangible (or recording) storage medium or implemented over some type of transmission medium. As disclosed herein, the term "storage medium" may represent one or more devices for storing data, including read only memory (ROM), random access memory (RAM), magnetic RAM, magnetic disk storage mediums, optical storage mediums, flash memory devices and/or other tangible machine readable mediums for storing information. The term "computer-readable medium" may include, but is not limited to, portable or fixed storage devices, optical storage devices, and various other mediums capable of storing, containing or carrying instruction(s) and/or data.

Furthermore, example embodiments may be implemented by hardware, software, firmware, middleware, microcode, hardware description languages, or any combination thereof. When implemented in software, firmware, middleware or microcode, the program code or code segments to perform the necessary tasks may be stored in a machine or computer readable medium such as a computer readable storage medium. When implemented in software, a processor or processors will execute the software, and thus be special purpose machines for performing the necessary tasks.

A code segment may represent a procedure, function, subprogram, program, routine, subroutine, module, software package, class, or any combination of instructions, data structures or program statements. A code segment may be coupled to another code segment or a hardware circuit by passing and/or receiving information, data, arguments, parameters or memory contents. Information, arguments, parameters, data, etc. may be passed, forwarded, or transmitted via any suitable means including memory sharing, message passing, token passing, network transmission, etc.

As used herein, the term "user equipment" may be synonymous to a mobile user, mobile station, mobile terminal, user, subscriber, wireless terminal, terminal and/or remote station and may describe a remote user of wireless resources in a wireless communication network. Accordingly, user equipment may be a wireless phone, wireless equipped laptop, wireless equipped appliance, etc.

The term "base station" may be understood as a one or more cell sites, base stations, nodeBs, enhanced NodeBs, access points, and/or any terminus of radio frequency communication. Although current network architectures may consider a distinction between mobile/user devices and access points/cell sites, the example embodiments described hereafter may generally be applicable to architectures where that distinction is not so clear, such as ad hoc and/or mesh network architectures, for example.

Communication from the base station to the user equipment is typically called downlink or forward link communication. Communication from the user equipment to the base station is typically called uplink or reverse link communication.

While example embodiments will be described with respect to the Long Term Evolution standard (LTE), it will be appreciated that the teachings provided herein are applicable to any wireless standard.

FIG. 1 illustrates a portion of a wireless communication network according to one example embodiment. As shown, a plurality of cell sites 10 may each include a base station 20 and antennas 22. Each base station 20 has one or more antennas 22, and one or more of the antennas 22 are associated with one or more sectors 24. In a typical deployment, the geographic area (referred to as a cell) served by a base station 20 is divided into three sectors 24, and each base station 20 has two or more antennas 22 serving the uplink communications by user equipments (UEs) in each sector 24. Each base station 20 includes dedicated and/or shared processing components for handling each sector 24 associated with the base station 20. For ease of description, these processing components may also be referred to as a sector.

In this embodiment, the base stations 20 may communicate with one another over connections referred to as the backhaul. In order to permit joint processing associated with Coordinated Multi-Point (CoMP) techniques, each sector forms a cluster of received signals. Stated another way, each sector forms a cluster of antennas where each received signal in the cluster is received by a respective antenna in the cluster. In one embodiment, the cluster may comprise all antennas of one or more sectors. In another embodiment, the cluster may comprise one or more antennas from one or more sectors. The received signals whether complex raw I&Q samples or processed I&Q samples are communicated to a serving sector for processing.

A cluster of received signals or antennas may be formed in various ways. For example, a sector may measure the received signal strength (RSS) of transmissions in nearby sectors, and those antennas of sectors having an RSS above a threshold are added to the cluster. As will be appreciated, the sectors at the same base station 20 often pass this test, and the antennas thereof form part of the cluster. For these sectors, sharing the shared information is relatively easy as the sharing occurs between co-located electronic components in the base station 20. However, for sectors at different sites, the information is shared over connections or interfaces between the base stations 20 collectively referred to as the backhaul.

In another embodiment, a sector may poll neighbors for the RSS information of UEs, and the sector may add antennas of neighbor sectors based on the RSS information for UEs served by the polled sector. For example, the antenna of a neighbor sector is added to the cluster if the RSS information exceeds a threshold.

In yet another embodiment, the clusters may be fixed through empirical study.

Note that clusters may not always include all antennas within a given sector due to different RSS or due to a desire to reduce computational complexity.

In addition to determining a cluster of received signals or antennas, each sector shall determine a set of UEs for which associated reference sequences shall be communicated to the serving sector. Similar to the cluster generating techniques above, the UEs may be statically chosen or dynamically selected based on specific characteristics (e.g., RSS above a threshold, proximity of sector to the serving sector, etc.). All UEs within the selected set shall have information for their transmissions (e.g., reference sequences, transmission powers) communicated to the serving sector.

Figure 2:
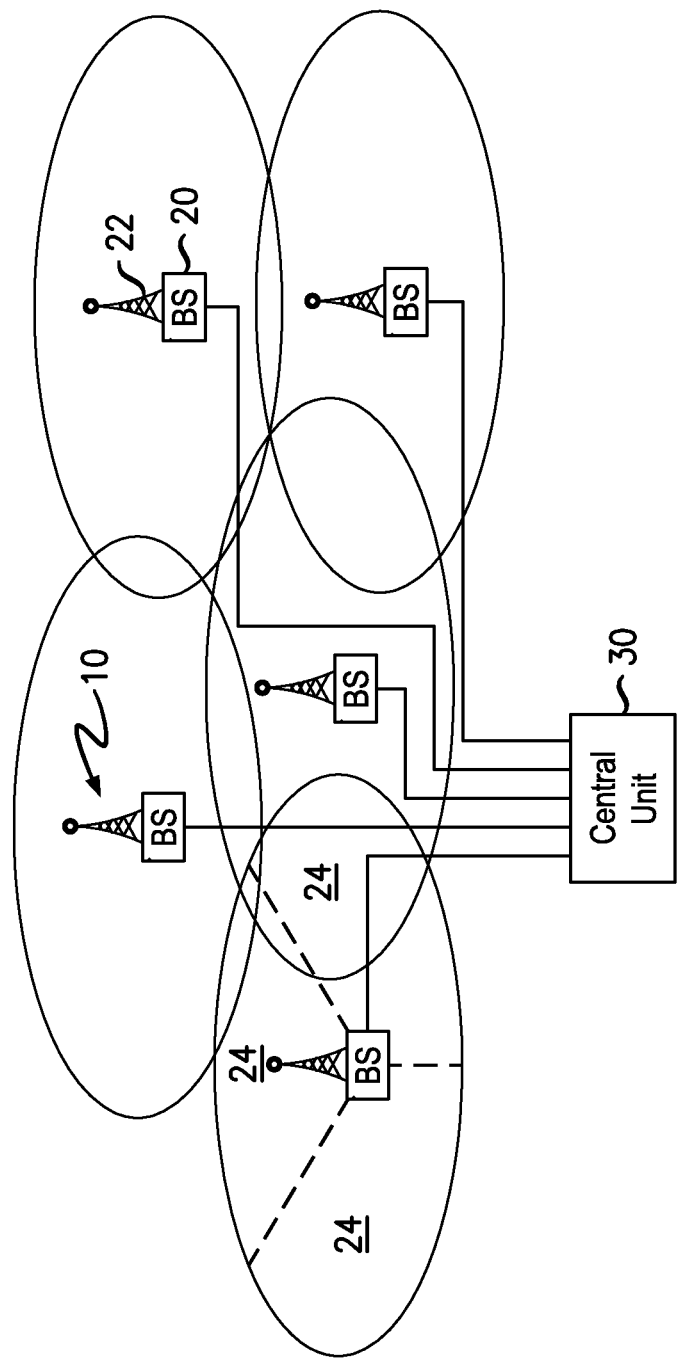
FIG. 2 illustrates a portion of a wireless communication network according to another embodiment.

FIG. 2 illustrates another example embodiment of a portion of a wireless communication network. In this embodiment, each of the base stations 20 is communicatively connected to a central unit 30. The connection between the base stations 20 and the central unit 30 is often called the backhaul. In this embodiment, processing operations may be offloaded to the central unit 30 instead of being performed at each base station 20.

In this embodiment, instead of determining clusters for each sector and sharing information between the sectors in a cluster, the central unit 30 receives the information from one or more antennas spanning the one or more sectors and forms clusters with a subset of the one or more antennas. Furthermore, transmission information for a selected set of UEs will be processed for filtering. Additionally, the central unit 30 will send selected post-processing information to the sectors. This will be described in further detail below.

Figure 3:
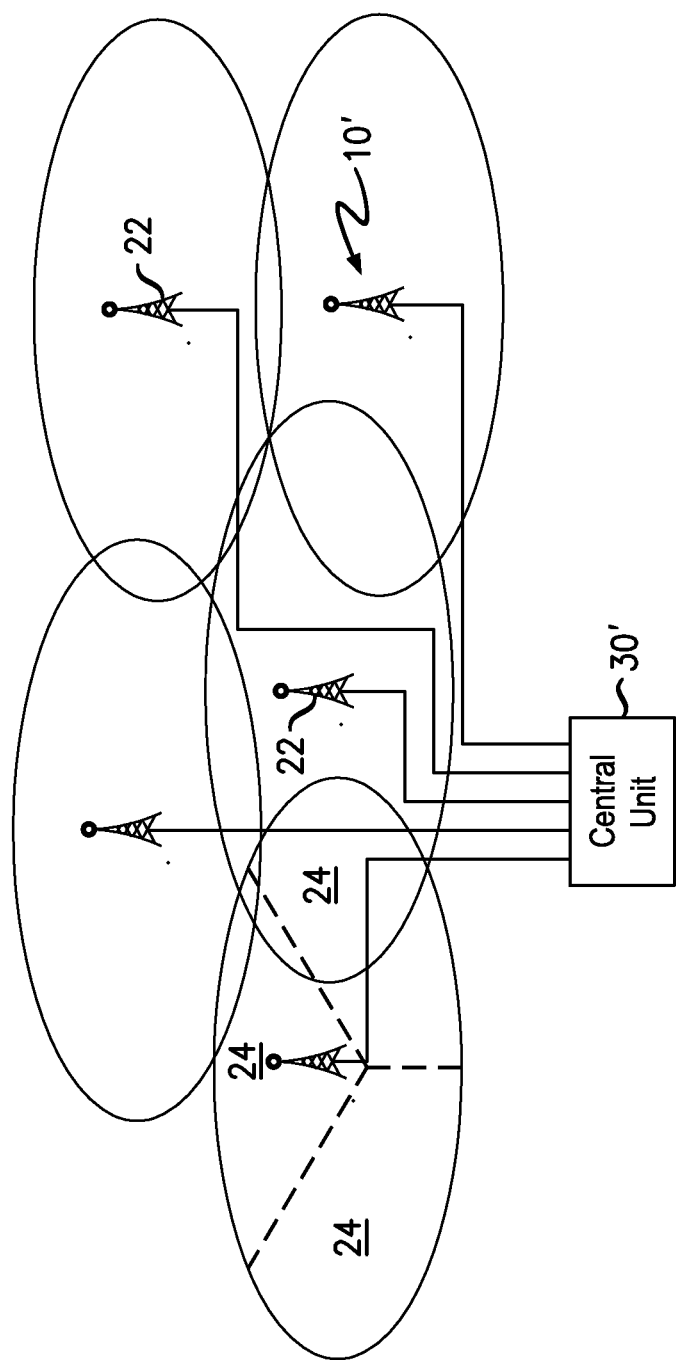
FIG. 3 illustrates a portion of a wireless communication network according to a further embodiment.

FIG. 3 illustrates a portion of a wireless communication network according to a further example embodiment. In this embodiment, each cell site 10' includes the antennas 22, but does not include a base station 20. Instead, the functionality of the base station 20 is performed at the central unit 30'. As will be appreciated, besides the antennas 22, the cell site 10' may include other components (often referred to as a remote radio head) to properly send and receive signals over the antennas 22.

In this embodiment, all processing occurs at the central unit 30'.

Figure 4:
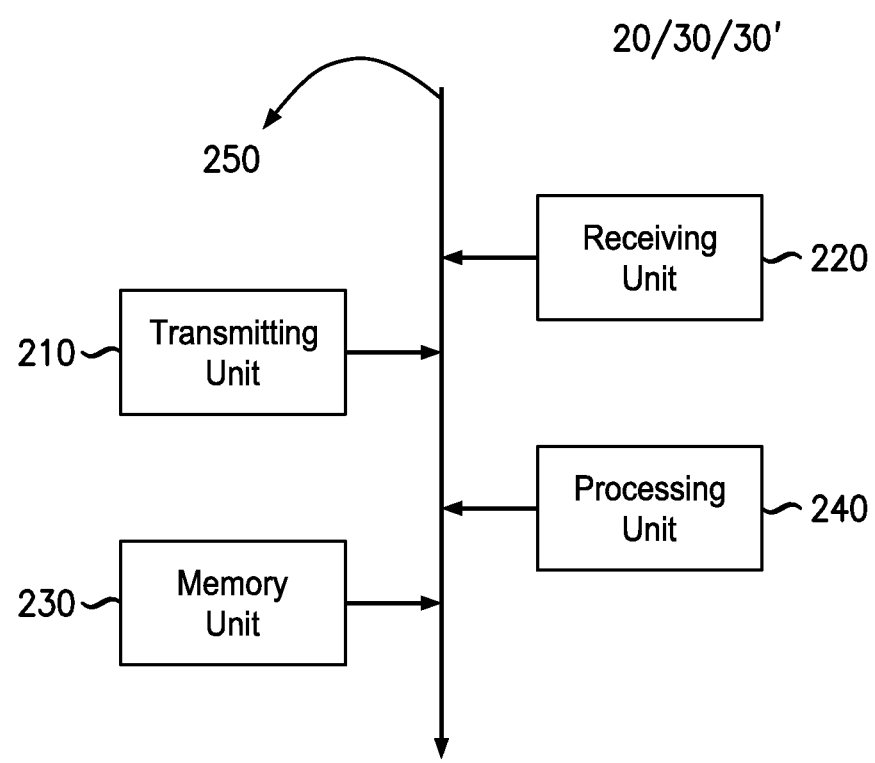
FIG. 4 illustrates an example architecture of a network element in FIGS. 1-3.

FIG. 4 illustrates an embodiment of a network element. The network element may be the base station 20 illustrated in FIGS. 1 and 2. The architecture illustrated in FIG. 4 may also serve as the central unit 30 and/or 30' in FIGS. 2 and 3.

As shown, the network element includes, for example, a transmitting unit 210, a receiving unit 220, a memory unit 230, a processing unit 240, and a data bus 250.

The transmitting unit 210, receiving unit 220, memory unit 230, and processing unit 240 may send data to and/or receive data from one another using the data bus 250.

The transmitting unit 210 is a device that includes hardware and any necessary software for transmitting signals including, for example, data signals and control signals to other network elements and/or transmitting signals over antennas 22.

The receiving unit 220 is a device that includes hardware and any necessary software for receiving signals including, for example, data signals and control signals from other network elements and/or from antennas 22.

The memory unit 230 may be one or more same or different devices configured to store data including magnetic storage, flash storage, etc. The memory unit 230 may store computer readable code, which configures the processing unit 240 into a special purpose machine for performing at least the methods according example embodiments described in this disclosure. The memory unit 230 may also store any input data, intermediate data, and output data for the processing unit 240 during performance of these methods.

The processing unit 240 may be any device capable of processing data including, for example, one or more processors or microprocessors configured to carry out specific operations based on input data, or capable of executing instructions included in computer readable code.

Figure 5:
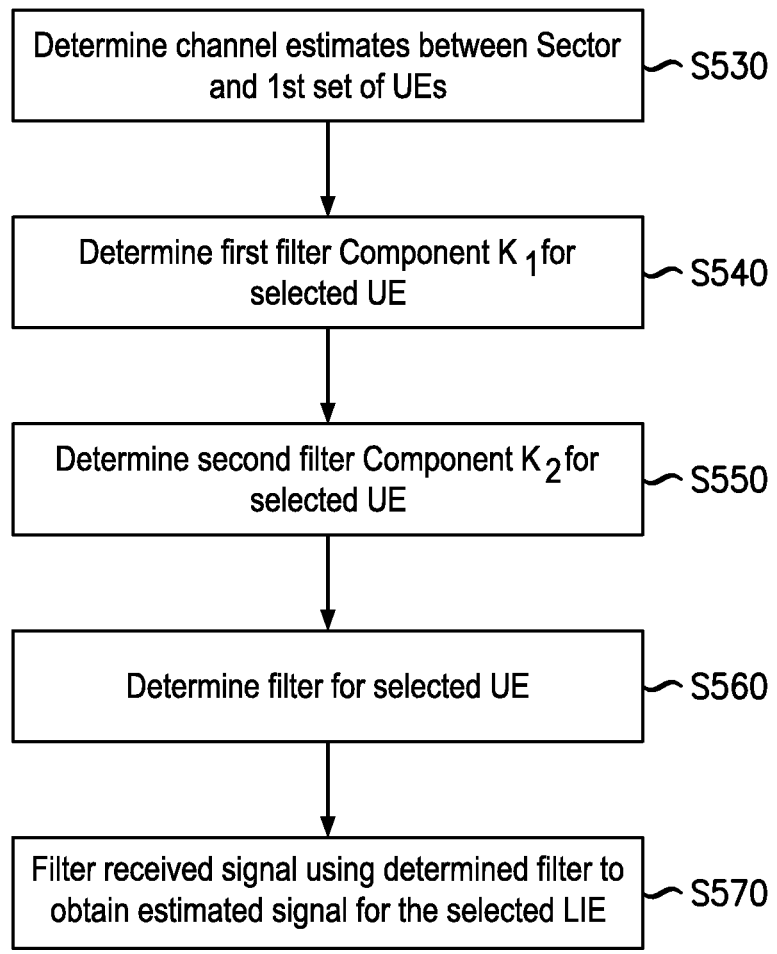
FIG. 5 illustrates a method of receiving a signal in a wireless communication network according to one embodiment.

Next, a method of receiving a signal according to an embodiment will be described with respect to FIG. 5. FIG. 5 illustrates a flow chart of a method of receiving a signal according to an embodiment. This embodiment will be described as being implemented by the wireless communication network of FIG. 1. In particular, this embodiment will be described as implemented by a sector (e.g., processing unit 240) of a base station 20 for a selected UE served by the sector (hence, "serving sector"). It is assumed that the cluster of received signals (antennas) that are to be processed to obtain an estimate of the signal transmitted by the selected UE at the serving sector has been determined via any well-known method; for example, such as those discussed above.

It is further assumed in this embodiment that a first set of UEs (including the selected UE) has been identified for each sector based on a suitable criterion (e.g. the corresponding long-term average signal strength or path loss values) as described above. In an alternative embodiment, this identification may be carried out as part of the processing that occurs during the execution of the method of FIG. 5. As shown, in step S530 the serving sector determines channel estimates between the each of the received signals (antennas) in the selected cluster and each UE in the first set. Because the reference sequences and received signals are known and shared within the cluster, the serving sector may determine the channel estimates $\hat{h}$ in any well-known manner based on the signals received at the sector and the known reference sequences.

Then, in step S540, the processing unit 240 determines a first filter component based on the UEs for which the reference sequences are known (i.e., the first set of UEs). For example, for a selected ith UE served by the sector, the first filter component may be determined according to expression (1A) below:

$$K_1 = \sum_{j \in S, j \neq i} p_j \hat{h}_j * \hat{h}_j^H \quad (1A)$$

where $K_1$ is the first filter component, $p_j$ is the transmission power of the jth UE in the first set S, $\hat{h}_j$ is the vector of channel estimates from the jth UE to each of the antennas in the cluster, "i" is the selected UE, and $\hat{h}_j^H$ represents the Hermitian of the vector of channel estimates from the jth UE to each of the antennas in the cluster. In terms of dimensionality, $K_1$ is M×M and $\hat{h}_j$ is M×1 where M is the number of antennas in the cluster.

In an alternative embodiment, the first filter component may be determined according to expression (1B) below:

$$K_1 = \sum_{j \in S} p_j \hat{h}_j * \hat{h}_j^H \quad (1B)$$

Here, the ith UE is not excluded from the determination of the first filter component as in expression (1A). The difference between the final results obtained using expressions (1A) and (1B) is merely a scaling factor that may be ignored.

Next, the processing unit 240 determines a second filter component in step S550. The processing unit 240 determines the second filter component according the second expression below:

$$K_2 = \frac{1}{L} \sum_{l=1}^{L} \left( r_l - \sum_{j \in S} \hat{h}_j \sqrt{p_j} s_{j,l} \right) \left( r_l - \sum_{j \in S} \hat{h}_j \sqrt{p_j} s_{j,l} \right)^H \quad (2)$$

where $K_2$ is the second filter component, L>=1 represents the number of samples over which the estimate can be averaged (e.g., 144 for a physical resource block (PRB) in 3GPP LTE), $r_l$ represents the lth sample of the M×1 dimensional received signal where M is the number of antennas included in the cluster, and $s_{j,i}$ represents the signal transmitted by the jth UE on the lth sample. As will be appreciated from expression (2), the estimated contributions of the UEs in the first set (UEs for which the reference sequences are known), is removed from the second filter component.

In an alternative embodiment, the estimated contributions of the UEs in the first set, except for the selected ith UE may be removed in determining the second filter component.

In step S560, the processing unit 240 determines a filter for the ith UE served by the sector based on the first and second filter components. For example, the filter may be determined according to expression (3) below:

$$w_i = (K_1 + K_2)^{-1} \sqrt{p_i} \hat{h}_i \quad (3)$$

where $w_i$ is the filter for the selected ith UE.

The processing unit 240 then filters, in step S570, a received signal r using the determined filter according to expression (4) below to obtain an estimate of the signal received from the selected ith UE:

$$\hat{s}_i = w_i^H * r \quad (4)$$

where $\hat{s}_i$ is the estimated signal received from the selected ith UE, and r is the M-dimensional signal vector spanning the selected cluster of antennas.

As will be appreciated, the method described above may be repeated for each UE served by a sector, and may be repeated at each sector.

With the implementation of FIG. 3, instead of performing the steps or operations of FIG. 5 at the processing unit 240 of a sector of a base station 20, the steps or operations are performed at the processing unit 240 of the central unit 30'.

With the implementation of FIG. 2, the central unit 30 performs steps S530-S560 to obtain the filter. In this embodiment, the central unit 30 may use expression (1B) to generate a first filter component common to multiple sectors/UEs. The central unit 30 then sends the filter to the sector of the base station 20, and the sector performs step S570 using the received filter to obtain the estimated signal from the selected UE.

As will be appreciated from the above disclosure, the first filter component accounts for the contributions of a selected set of UEs at a sector, and may also account for UEs at other sectors including sectors at the same or different cell sites. As a result, the noise in the obtained estimated signal is significantly reduced, and a greater signal-to-noise-plus-interference ratio may be obtained.

The invention being thus described, it will be obvious that the same may be varied in many ways. Such variations are not to be regarded as a departure from the invention, and all such modifications are intended to be included within the scope of the invention.

We claim:

1. A method of receiving a signal in a wireless communication network, comprising:
   determining, at a network element, a first filter component based on reference sequences for user equipments in a first set;
   determining a second filter component, the second filter component being based on a plurality of received signals and having estimated contributions to the plurality of received signals by the user equipments in the first set removed, the plurality of received signals being associated with a plurality of antennas;
   filtering a selected received signal based on the first and second filter components to obtain an estimated signal for a selected user equipment.

2. The method of claim 1, wherein the determining a first filter component comprises:
   determining channel estimates based on the reference sequences for the user equipments in the first set except for the selected user equipment; and
   determining the first filter component based on the channel estimates.

3. The method of claim 2, wherein the determining the first filter component determines the first filter component based on (i) the channel estimates and (ii) transmission powers for the user equipments in the first set except for the selected user equipment.

4. The method of claim 2, wherein the network element is a serving base station serving the selected user equipment, and one or more of the plurality of antennas is associated with one or more sectors of the serving base station.

5. The method of claim 4, wherein one or more of the plurality of antennas is associated with one or more sectors of one or more other base stations.

6. The method of claim 5, further comprising:
receiving, at the serving base station, one or more of the plurality of received signals from the one or more other base stations.

7. The method of claim 1, wherein the determining a first filter component comprises:
determining channel estimates associated with the user equipments in the first set based on the reference sequences; and
determining the first filter component based on the channel estimates.

8. The method of claim 7, wherein the determining the first filter component determines the first filter component based on the channel estimates and transmission powers for the user equipments in the first set.

9. The method of claim 7, wherein the network element is a central unit associated with the plurality of antennas, and one or more of the plurality of antennas is associated with one or more sectors of a cell site.

10. The method of claim 9, wherein one or more of the plurality of antennas is associated with one or more sectors of one or more other cell sites.

11. The method of claim 10, further comprising:
receiving, at the central unit, the plurality of received signals.

12. The method of claim 7, wherein
the network element is a central unit associated with a plurality of base stations, one or more of the plurality of antennas associated with the plurality of base stations;
the determining a first filter component and the determining a second filter component are performed at the central unit; and
the filtering includes,
determining, at the central unit, a filter for the selected user equipment; and
sending, from the central unit, the determined filter to one of the plurality of base stations serving the selected user equipment; and
filtering, at the serving base station, the selected received signal based on the determined filter to obtain the estimated signal for the selected user equipment.

13. The method of claim 1, wherein the determining a second filter component comprises:
for each antenna in the plurality of antennas,
removing the estimated contributions of the user equipments in the first set from the received signal associated with the antenna to obtain a modified signal.

14. The method of claim 13, further comprising:
processing the modified signal to obtain a result;
accumulating the results; and
averaging the accumulated results to obtain the second filter component.

15. The method of claim 1, wherein the determining a second filter component comprises:
for each antenna in the plurality of antennas,
removing the estimated contributions of the user equipments in the first set except for the selected user equipment from the received signal associated with the antenna to obtain a modified signal.

16. The method of claim 1, wherein the filtering comprises:
determining a channel estimate associated with the selected user equipment based on a reference sequence associated with the selected user equipment; and
filtering the selected received signal based on the channel estimate and the first and second filter components.

17. The method of claim 16, wherein the filtering filters the selected received signal based on a transmission power of the selected user equipment, the channel estimate, and the first and second filter components.

18. A network element, comprising:
a memory configured to store reference sequences for user equipments in a first set;
a processor configured to determine a first filter component based on the reference sequences for user equipments in the first set;
the processor configured to determine a second filter component, the second filter component being based on a plurality of received signals and having estimated contributions to the plurality of received signals by the user equipments in the first set removed, the plurality of received signals being associated with a plurality of antennas; and
the processor configured to determine a filter based on the first and second filter components, the filter for obtaining an estimated signal for a selected user equipment.

19. The network element of claim 18, wherein the processor is configured to filter a selected cluster of the plurality of received signals using the filter to obtain the estimated signal for the selected user equipment.

20. The network element of claim 18, wherein the processor is configured to output the filter to another network element.

* * * * *